(12) United States Patent
Busch et al.

(10) Patent No.: US 8,487,979 B2
(45) Date of Patent: Jul. 16, 2013

(54) SIGNAL SPECTRA DETECTION SYSTEM

(75) Inventors: Darryl Busch, Eden Prairie, MN (US); Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1267 days.

(21) Appl. No.: 12/324,709

(22) Filed: Nov. 26, 2008

(65) Prior Publication Data

US 2012/0098924 A1   Apr. 26, 2012

(51) Int. Cl.
*H04N 7/00* (2011.01)

(52) U.S. Cl.
USPC ............... 348/36; 348/39; 348/164; 356/303; 356/302; 356/308; 356/307; 356/319; 702/190; 702/194; 702/189

(58) Field of Classification Search
USPC ............. 348/36, 39, 164; 356/303, 302, 308, 356/307, 319; 702/190, 194, 189
See application file for complete search history.

(56) References Cited

U.S. PATENT DOCUMENTS

| | | | |
|---|---|---|---|
| 4,221,966 A | 9/1980 | Kerr et al. | |
| 4,568,186 A * | 2/1986 | Yoshimura et al. | 356/308 |
| 4,678,332 A | 7/1987 | Rock et al. | |
| 5,784,162 A * | 7/1998 | Cabib et al. | 356/456 |
| 5,982,486 A * | 11/1999 | Wang | 356/451 |
| 6,862,535 B2 | 3/2005 | Binder | |
| 7,096,125 B2 | 8/2006 | Padmanabhan et al. | |
| 7,242,806 B2 | 7/2007 | Johnson et al. | |
| 2007/0093970 A1 | 4/2007 | Padmanabhan et al. | |

FOREIGN PATENT DOCUMENTS

WO    03054824    7/2003

* cited by examiner

*Primary Examiner* — Shawn An
(74) *Attorney, Agent, or Firm* — Seager Tufet & Wickhem LLC.

(57) ABSTRACT

The invention is a detection system that provides for background removal from a field of view (FOV) of spectra. A panoramic field of regard may be partitioned into a large number of FOV's. An FOV may include spectra including that of a target substance. Such detection may require removing the spectra other than that of the target. This may amount to removal of the background with an estimated background developed from spectra of one or more FOV's which may be similar to the background of the FOV with the target. An estimation of the background may be a sum of a number of FOV spectra where each spectrum is assigned a weight, the total amount of the weights being one.

8 Claims, 20 Drawing Sheets

SIGNAL SPECTRA DETECTION SYSTEM

The U.S. Government may have rights in the present invention.

BACKGROUND

The invention pertains to detection of spectra and particularly to detection of certain spectra among other spectra such as background and interferent.

SUMMARY

The invention is a detection system that provides for background removal from a field of view (FOV) of spectra. A panoramic field of regard may be partitioned into a large number of FOV's. An FOV may include spectra including that of a target substance. Such detection may require removing the spectra other than that of the target. This may amount to removal of the background with an estimated background developed from spectra of one or more FOV's which may be similar to the background of the FOV with the target. An estimation of the background may be, for example, a sum of a number of estimated backgrounds from recent FOV spectra where each estimated background is assigned a weight, the total amount of the weights being one.

DESCRIPTION

Figure 1:
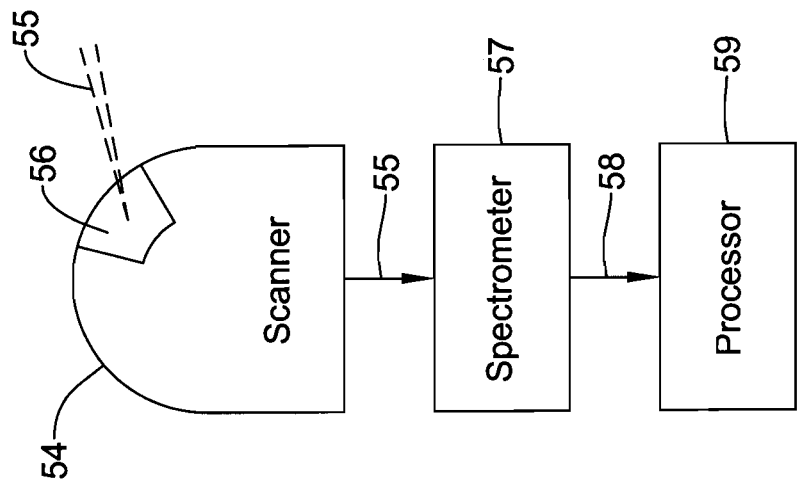
FIG. 1 is a diagram of an illustrative apparatus used for the present system.

The present invention relates to identification of small signals embedded in a large background signal. The system may be for extracting a target vapor cloud spectrum that is embedded in a background spectrum. The system may be a remote chemical detection system using a scanning spectrometer where an entire panoramic field of regard (FOR) can be partitioned into hundreds, thousands or more field of views (FOV's). The large number of FOV's is due a desire to have a large FOR, with negligible gaps between FOV's, and to use a small FOV so that it can be filled by a small, distant cloud and thus maximize the cloud signal. The objective of the system is to detect, if any, one or more target chemicals in each FOV. The radiance, thus the resulting spectrum, of each FOV may include those from the background, the atmosphere, other chemical clouds, and, if any, the target chemical cloud. A contribution of the spectral signal from the target chemical cloud may be a very small fraction of the total spectrum. Detection of the target chemical with high sensitivity may require removing spectral characteristics other than those of the target chemical cloud.

A signal from spectrometer may need calibration to correct the signal's bias and gain, to sample at the correct frequency comb. Due to design constraints or inaccurate calibration, system artifacts may be introduced into the spectrum. These system artifacts often interfere and distort the spectral characteristics of the target chemical causing a poor detection performance.

The system artifacts, whose magnitude is based on the dynamics between the external and internal temperatures and system response, may vary from system to system and with time. Therefore, it appears difficult to model and remove artifacts solely from an input spectrum.

Background and constituents in the atmosphere, such as ozone and water, may introduce their own spectral signatures, which also interfere and distort a target chemical spectral signal. In order to achieve high detection sensitivity, these unwanted spectral characteristics should be removed.

Some systems may apply a background subtraction approach, which recursively estimates and stores a reference background for each FOV from the spectrum of the same FOV, to alleviate these issues. These systems, however, are limited to be stationery deployments with only a few FOV's as the whole FOR. The limitation arises because a small FOV is more sensitive to small distant clouds (the cloud fills the FOV), but more FOV's are required to fill the FOR. Hardware limitation and software management may prevent storing background references in a large FOR. In non-stationary applications, the platform is moving and each FOV is potentially unseen before, and so acquiring the reference background without the target chemical cloud might not be possible.

One approach may include estimating a background spectrum from one adjacent field of view. This approach is most immune to changes in background, but would not necessarily be able to detect the target chemical if the chemical cloud spans both fields of view. Another approach may use a more distant field of view. This approach is most immune to diffuse clouds that progress slowly over multiple fields of view, but would not necessarily detect the target chemical if the background changed significantly. Another approach may include estimating a background spectrum from n spectra, for example, applying a weighted average. This approach reduces the noise in the estimated background, but would not necessarily be able to detect the target chemical due to either of the previous causes.

The system overcomes these challenges described above by computing an estimated background from a plurality of intermediate estimates, each of which is derived from a recent FOV background. The final estimated background may be fully weighted toward any one of the n intermediate estimates, or evenly weighted across the n intermediate estimates, or use a weighting curve skewed toward any of the n intermediate estimates.

Since the input and the estimated background radiances pass through the same system components, the resulting spectra may have the same system artifacts. The difference between the radiances does not necessarily have the system artifact characteristics.

Since the final estimated background spectrum may be derived from weighed intermediate estimates, each of which is adjusted to match closely to the spectrum of the input FOV, the estimated background and atmospheric constituents could be very similar. Again the difference between the input spectrum and the estimated background spectrum should remove most, if not all, the spectral characteristics from the background and atmosphere.

The system may be coded in software executables in GPC or DSP. A parameter file that stores the values of parameters may accompany the executable and be loaded into the GPC or DSP for the specific list of target chemicals.

The standoff chemical vapor detector may be fully automatic and provide real-time, on the move detection for contamination avoidance and reconnaissance operations on a wide variety of land, air, space and sea platforms. A passive, remote Fourier transform infrared (FTIR) spectroscopy may be used to detect chemical clouds at a distance using only thermal emission from the scene.

The detector may have pre-processing, feature extraction and classification stages. The pre-processing stage may calculate the scene spectrum and correct for system-to-system variations including gain, offset, spectral artifacts and differences in resolution. The pre-processing stage may also include the background estimation and removal process. The feature extraction stage may compute a set of salient features that are tuned to the characteristic spectral bands of the target chemicals represented by templates, and to those of common interfering gases and particulates. The classification stage may feed the feature set into trained neural networks to detect the target chemicals while rejecting background and interferents.

The standoff chemical detection system passively detects target chemicals in a scene. Interferograms may be generated from received scene spectral information. The interferogram may be apodized, and a chirp fast Fourier transform may be performed on the apodized interferogram. A calibration curve may be applied to correct system gain and/or offset, background differencing may be applied to remove system artifacts and background spectral characteristics and a feature vector may be generated based on comparison of the transformed, background-removed spectral information to predetermined target chemical shape templates. The feature vector may be provided to a classifier to identify the existence and identity of a chemical threat.

The system calibration may be a function of one or two known temperature sources, generating a gain and/or an offset to apply to the spectra. Apodization may be performed to correct for the effect of asymmetry on the interferogram. The spectral transform may be a chirp type of transform that allows sampling of data at a selected frequency comb to calibrate between laser reference frequencies. A zoom fast Fourier transform may be used rather than the chirp Fourier transform to obtain the spectral signature. The system gain and/or offset may be applied to the spectra followed by normalization with a Planck's function. The characteristics of the normalized spectra may be quantified by a feature vector, which consists of a set of features. Each feature may include the results of a comparison of a chemical vapor shape template to the selected normalized spectral region using a least squares fit algorithm. For each shape template, values for the amplitude, slope, offset, and mean square error may be calculated. Characteristics of each potential target chemical may be captured in a specific subset of the feature vector. The feature vector subset for each threat may be processed by a separate neural network for the detection of each potential threat. The vector subsets may be processed by one neural network with multiple layers that is trained to process all vectors simultaneously. The presence or absence of the target chemical may be made based on a sequential decision making process where processing is stopped once a decision is made regardless of the existence of further data to process.

The chemical detection system may utilize a lower resolution search mode, and a higher resolution confirmation mode, where both modes utilize the same detection algorithms with different shape templates and neural network coefficients. The neural network may be trained using a large database of training data. The network may be iteratively trained using partially random subsets of the training data. Problematic data from previous subsets may be included in further subsets to improve the training.

FIG. 1 shows an instance of an apparatus used for the present system. A scanner 54 may be used for obtaining the radiance 55 from the FOV's of the field of regard via a window 56. The radiance 55 may go through a set of optics and into a spectrometer 57. The optics may be in either the scanner 54 or the spectrometer 57, or both. The spectrometer may identify and/or measure amplitudes and wavelengths of radiance 55. The radiance 55, including identification and/or wavelength information, may be converted to an electrical signal 58 and provided to a processor 59. Processor 59 may calculate, for example, a spectrum of a target with the background effectively removed, provide graphical representations of the spectra, possibly identify the target such as an chemical agent cloud, and so forth.

Figure 2:
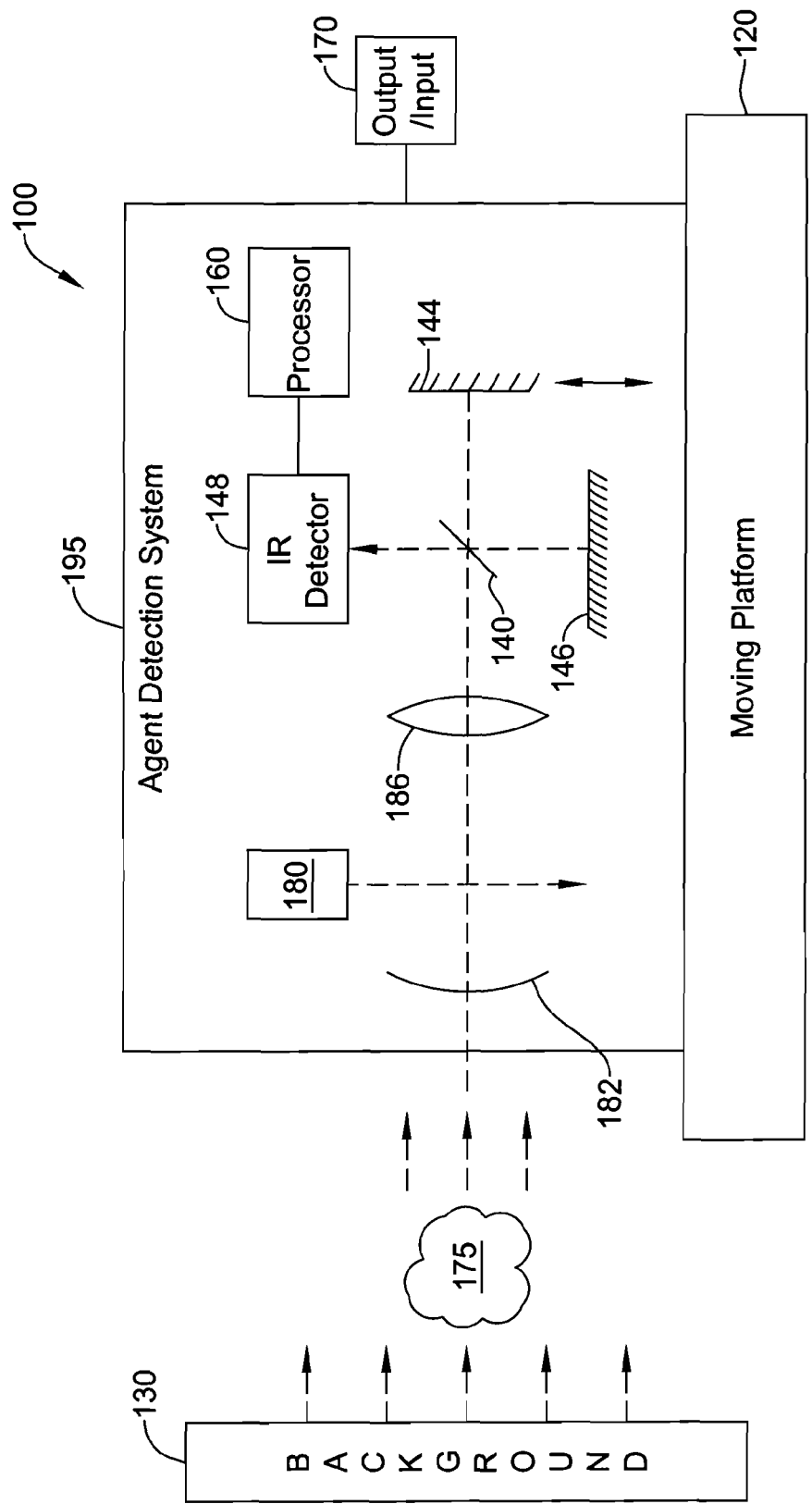
FIG. 2 is a block diagram of a passive mobile chemical vapor detection system.

The chemical detection system for use in detecting target chemical clouds in a mobile setting is shown generally at 100 in FIG. 2. The system may be housed in an enclosure 195 and mounted on a platform 120, such as a moving vehicle, whether ground, water, space or air based. The platform may also be stationary at a fixed site. The chemical detection system 100 may be used to detect and differentiate target chemical vapors 175 by class and by type with a very low false alarm rate. To meet this objective, a large field of regard (FOR) may be interrogated within defined time constraints on many application platforms under numerous conditions. The target chemicals to be detected may include classes of nerve, blister and blood chemical agents. Each class may have many chemical species. Numerous conditions may include ideal and real battlespace environments, with or without common battlefield interferents, and views of various types of backgrounds 130. Applications may include sea, land, space or air operation while stationary or on a moving platform.

One type of chemical detection system utilized may employ passive sensing of infrared (IR) emissions. The emissions, along with background emissions may be received through a lens or window 182 mounted in the enclosure 195, and focused by a lens system 186 onto a beam splitter element

140. Some of the IR may be transmitted by a first stationary mirror 144 mounted behind the beam splitter element 140. The rest of the IR may be reflected by element 140 onto a moving mirror 146. The reflected beams from the stationary mirror 144 and moving mirror 146 may combine to create an interference pattern, which is detected by an IR detector 148. An output of the IR detector may be sampled in one of two modes to create an interferogram, which is processed at a processor 160 to provide an output 170 such as a decision regarding whether or not a threat exists.

Figure 3:
FIG. 3 is a high level block flow diagram of the chemical vapor detection system of FIG. 2.

In a search mode as indicated at 210 in FIG. 3, a reduced resolution may be utilized at approximate a 16 wavenumber resolution. When potential target chemicals are detected, the mode may be switched at 220 to a confirmation mode with sequential decision making at 230. At 240, the extent of the potential threat may be mapped to provide an indication of the size and location of the threat.

Figure 4:
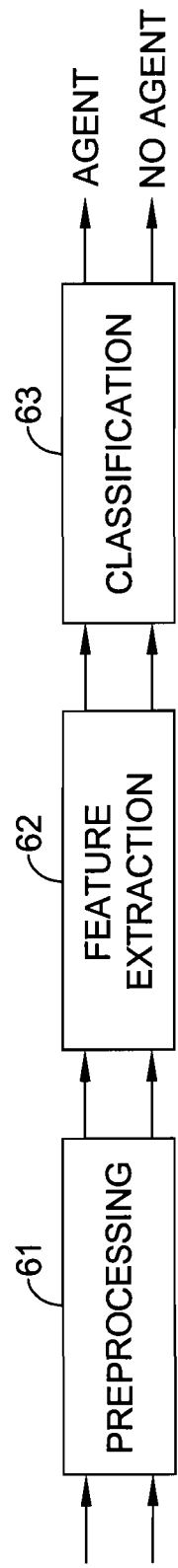
FIG. 4 is a high level block flow diagram of algorithms used to process interferograms generated by the chemical vapor detection system of FIG. 2.

FIG. 4 shows the stages of the detection system. FIG. 4 is a basic flow diagram of the system's processor 59 which may include pre-processing 61, feature extraction 62 and classification 63. In FIG. 4, the pre-processing module 61 may transform the electrical signal 58 to a normalized system-invariant, background-removed spectrum. Module 61 may provide apodization, chirp FFT, sensor gain correction, background differencing, Planck normalization, and so forth. The feature extraction module 62 may extract salient features for the classifier stage. Module 62 may provide metrics (e.g., scale, mse, offset slope) for best fit between a template and input. The classification module 63 may have a linear rule-based classifier to reduce "surprise" false alarms in the field. A trained independent neural network may identify the target chemical.

The processing may incorporate a reduced resolution (16 wavenumber) "search mode", but without loss of detection sensitivity relative to the 4 wavenumber resolution "confirm mode". The time to acquire radiometrically equivalent 16 wavenumber resolution data may be about 16 times less than that for 4 wavenumber resolution data. The 16 wavenumber resolution data does not necessarily provide as much detail as the 4 wavenumber resolution data and thus the target chemical differentiation and false alarm performances of the 16 wavenumber resolution mode can be poorer than that of the 4 wavenumber resolution mode. Therefore, a dual "search" and "confirmation" mode approach may be used where the 16 and the 4 wavenumber resolution modes are used in concert to meet timing and detection requirements. Of course, given faster processors, a single high resolution mode approach may be feasible, or a single mode of suitable resolution may be used. The system is not necessarily limited to 4 or 16 wave number resolution.

The search mode operation may detect virtually all regions of interest (ROI) that potentially have target chemicals. It should do this with a reasonably low rate of false triggers, but with the same sensitivity as the confirmation mode because to miss a cloud in search-mode is to effectively miss it entirely. A rule may be defined such that the search mode can be switched immediately to confirmation mode without scanning the entire field of regard. This may happen in the mode switch block when the search mode result reaches a high confidence decision that a target chemical cloud is present. Thus, the processing can detect the target chemical in the shortest time. The confirmation mode may apply a step and stare operation, in which high resolution (4 cm$^{-1}$) data is collected and analyzed to confirm the presence of, and classify the types of target chemicals in the field of view. Any false triggers from the search-mode may be rejected. Lower confidence search mode detections may be evaluated by the confirmation mode once the field of regard scans has been completed.

The system should detect down to very low target chemical signature strengths that approach the noise level of the system with a very low false alarm rate. The small signal detection capabilities may be dictated by the concentration and size of the chemical cloud 175, cloud distance and cloud-to-background temperature difference. Furthermore, the small target chemical signal should be detected under many variations, which could be due to system-to-system difference or changes in operational environment. For example, the frequency of a laser diode that provides the data sampling reference in the sensor may vary slightly from one laser to the next. As a result, the spectral resolution may vary from system to system. As another example, the detector response may be affected by temperature, and consequently the spectral characteristics could be affected. Extracting a consistent target chemical spectrum amid the noise and signal variations appears critical to success in target chemical detection.

The confirm mode may utilize a sequential decision process where a final detection decision is based on N-out-of-M detections from a sequence of confirm mode scans in the same field of view. When a sequential decision is invoked, the final decision at any instance of time may be "target chemical detected," "no target chemical detected," or no "final decision yet." A final "target chemical decision" may be made when strong evidence of target chemical is cumulated, such as a majority of the single decisions are target chemical decisions. On the other hand, a final decision on "no target chemical detected" may be made based on very weak or no evidence of target chemical presence. Thus, any spurious, single scan, false detection should be rejected. In such cases, the detection cycle may return back to the previous stage. No final decision is generally made when the number of cumulative detected target chemicals does not support nor deny the presence of a target chemical. If no final decision is made, additional sequential scans may be incorporated until a target or no target decision is made. Process rules may include an upper bound to the value of 'M' as a time constraint. Thus, a sequential decision may greatly reduce the false alarm rate and increase the confidence that a target chemical is present when the final "chemical detected" decision is made.

Once the sequential decision confirms the presence of a target chemical, the detection cycle may switch into the target cloud mapping stage 240. The target cloud mapping process may locate the extents of the target cloud based on a search pattern.

The search and confirmation modes may process interferograms to make a decision on the presence and class of the target chemical, if any. Both modes may utilize the same approach, as shown in FIG. 4, which includes preprocessing 61, feature extraction 62 and classification 63. Preprocessing may transform the interferogram to the spectral domain and tune the output to have a common standard free of any sensor- and system-variation. Feature extraction may compute the discriminatory features that are specific to the target types, interferents, and backgrounds. Classification may determine the classes and types of the target chemicals and reject the interferents and backgrounds. The input data to the two modes may differ in resolution. Accordingly, the parameters of the algorithms in the two modes may also differ. Details of the preprocessing, feature extraction and classification are described herein.

Figure 5:
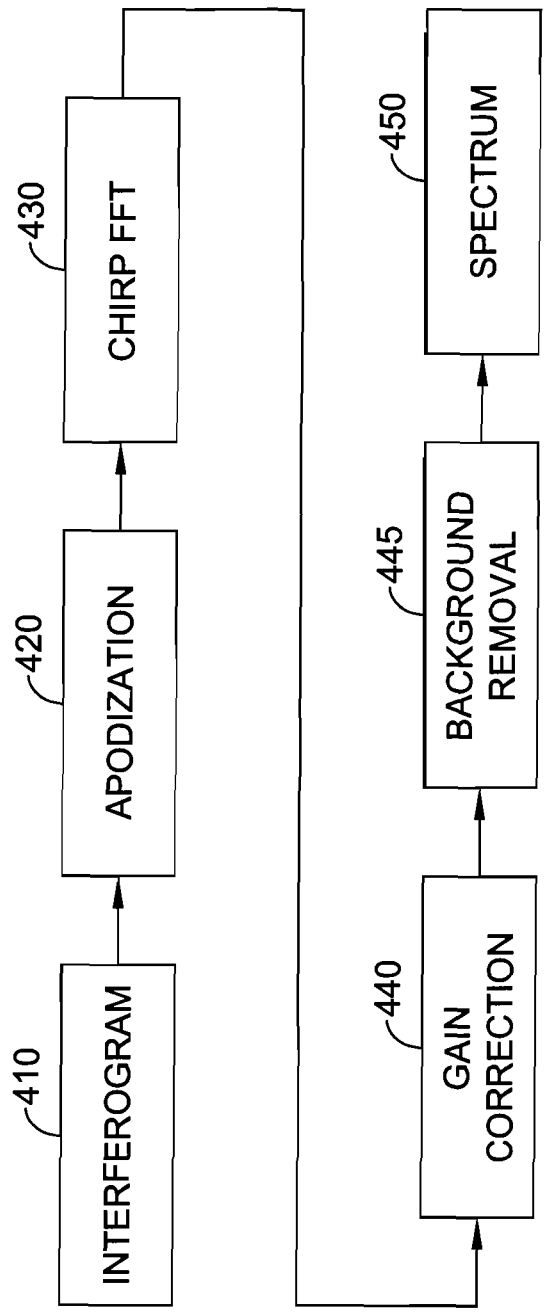
FIG. 5 is a block flow diagram of preprocessing of an interferogram.

Preprocessing may transform measured interferograms 410 into spectra as illustrated in FIG. 5. The preprocessing stage may compensate for any system-to-system variations and drift in time so that the resulting measurement artifacts can be ignored in subsequent algorithm stages. The artifacts that are specifically compensated may include frequency-dependent gain, interferogram centerburst position and spectral resolution. The compensation factors may be derived from factory calibration, and calibration functions that are executed at timed intervals, such as every 10 minutes, while in use. One artifact that is not compensated for in the preprocessing stage may include the signal-to-noise ratio (SNR) in the spectrum. SNR may be addressed in a subsequent stage.

The preprocessing stage may consist of the following functions, as shown in FIG. 5. Apodization 420 of the asymmetric interferogram may multiply the interferogram with a window function shown in block 420. Apodization 420 may remove antialiasing due to asymmetry consistent with a Mertz method of processing interferograms.

A chirp fast Fourier transform (FFT) 430 may calculate spectra to an identical frequency comb of four wavenumbers. Each sensor may have a different sampling reference. The chirp-FFT 430 may allow sampling of data at selected frequencies, and interpolate to a selected frequency comb to calibrate between the sensors.

Frequency dependent gain/offset correction 440 may provide a spectrum having an amplitude for each wavenumber to background removal 445. The gain/offset correction may be derived from a calibration process. In FIG. 2, an IR source 180 may periodically be inserted between the window 182 and lens 186 to block out ambient IR, and provide IR radiation. Gain and offset may be calculated to result in an output spectrum matching the source 180, such as a smooth black body. Two known sources represented by source 180 may be utilized to determine the gain and offset correction. One source may be used, and values for a second source may be estimated.

Background removal 445 may eliminate the spectral signatures of the background 130 and any remaining system artifacts that were not compensated in gain/offset correction 440. Background removal subtracts the output of 440 from an estimated background spectrum, which is computed by the Background Estimation approach.

Figure 6:
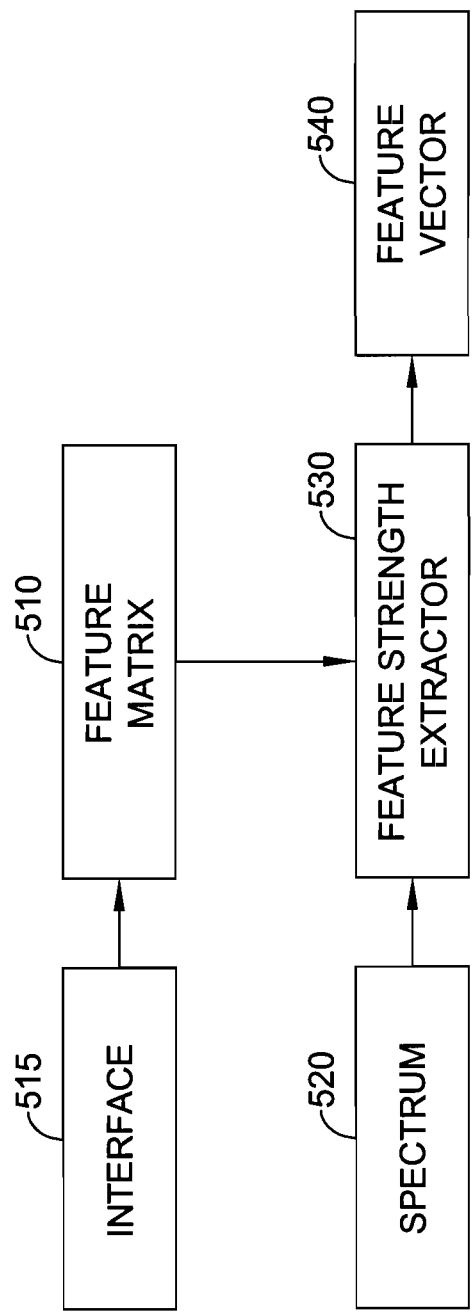
FIG. 6 is a block flow diagram of an algorithm for extracting a feature vector from a normalized spectrum.
Figure 7A:
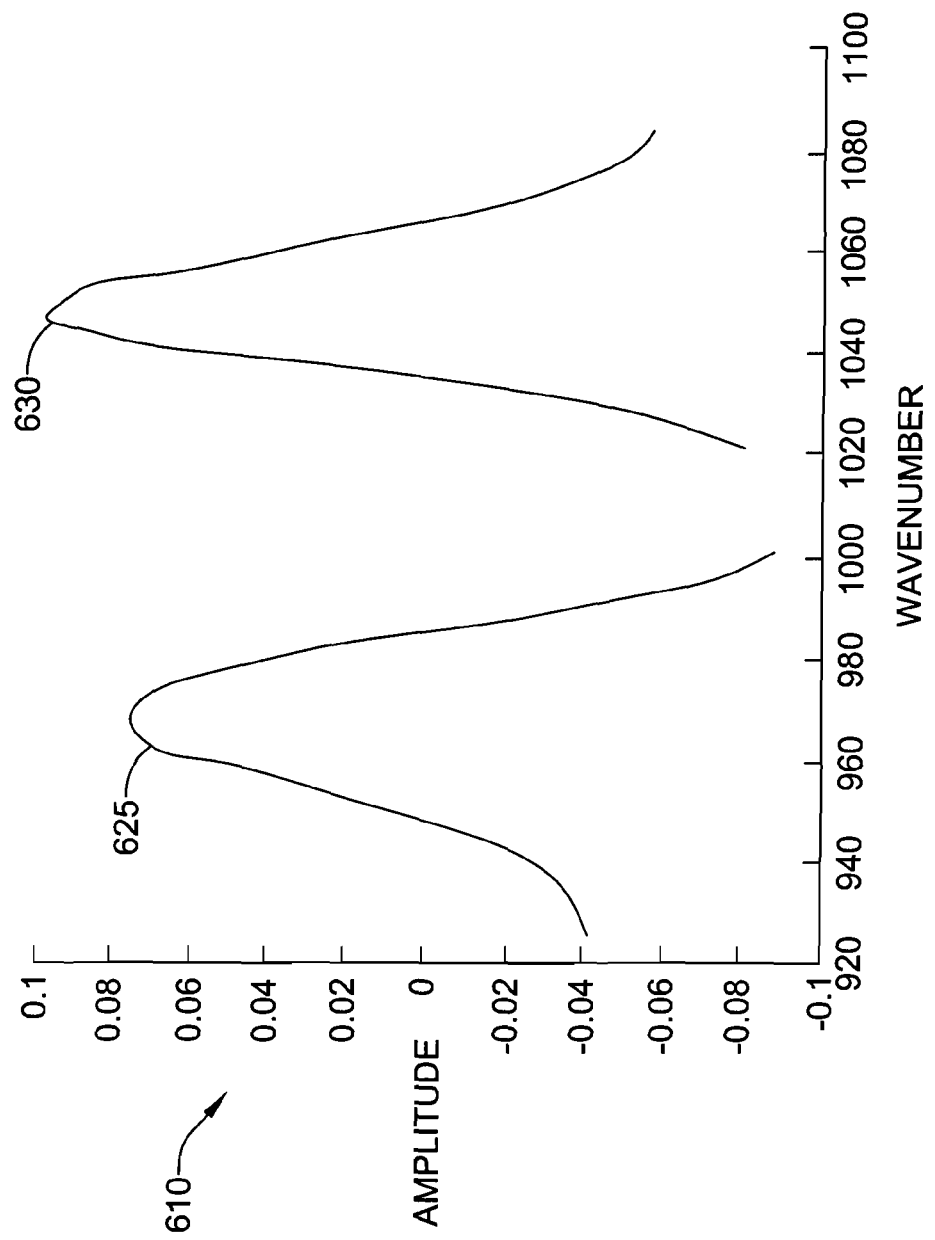
FIGS. 7a, 7b, 7c and 7d are representations of multiple different shape templates used to represent known target chemical peaks and common interferents.
Figure 7B:
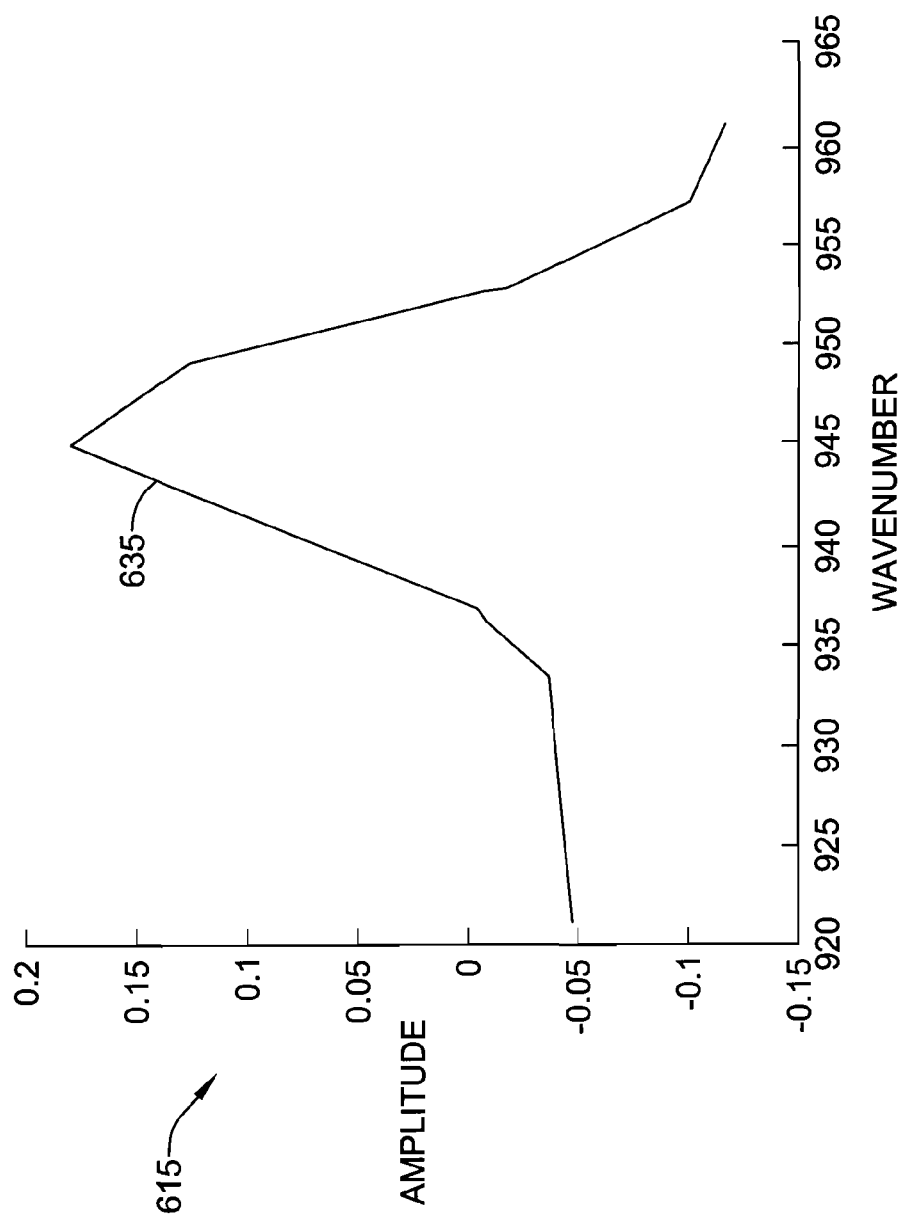
Figure 7C:
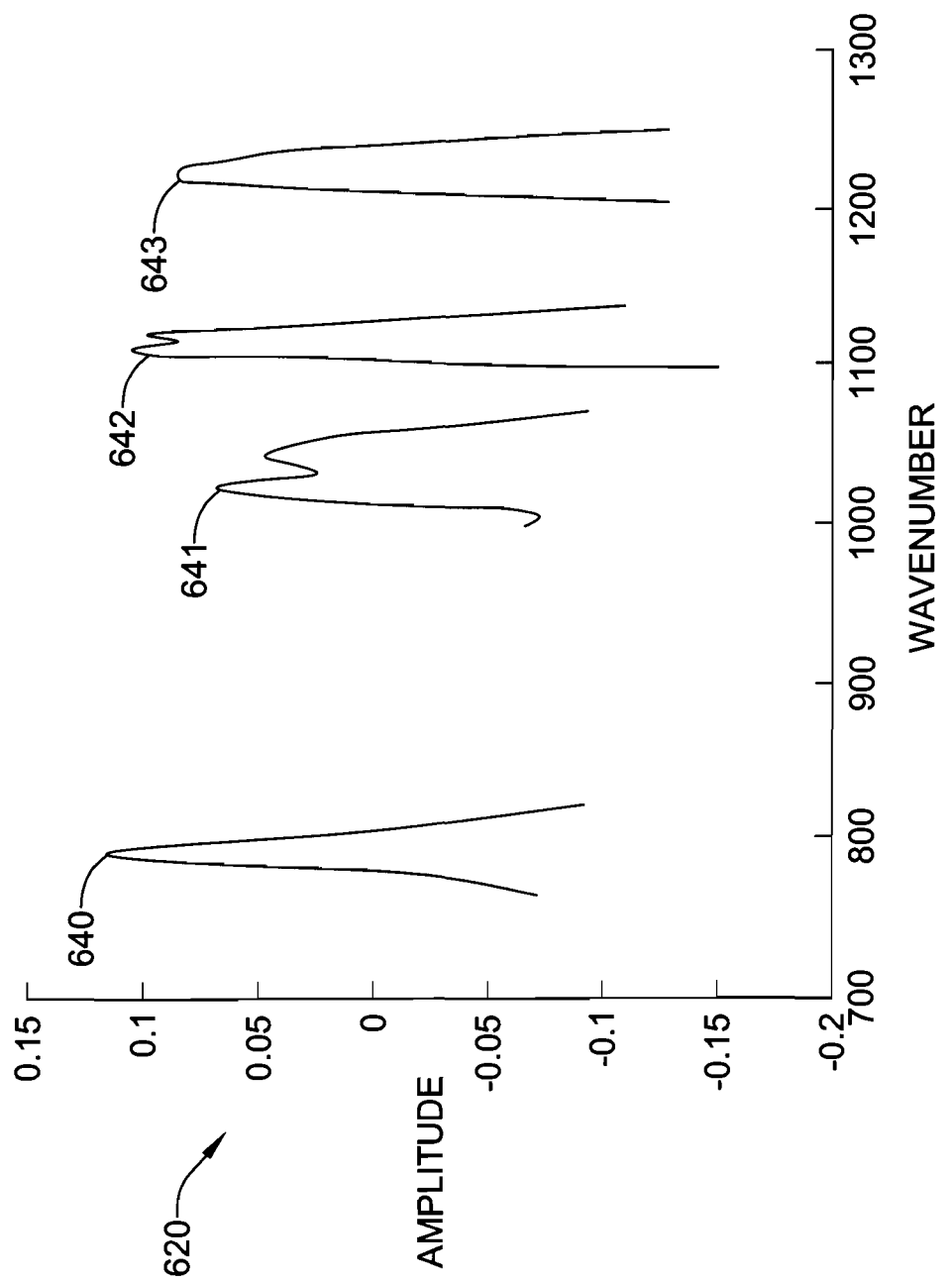
Figure 7D:
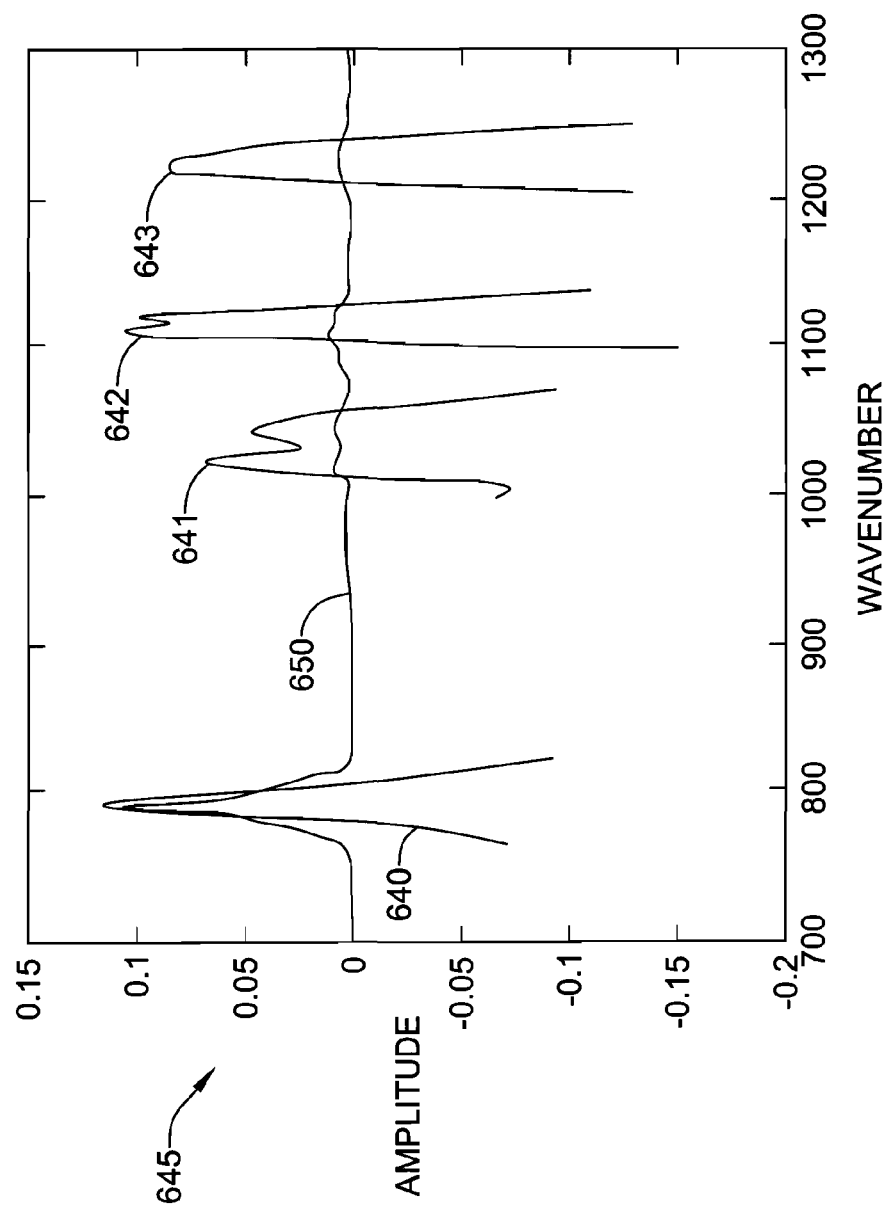

The feature extraction stage is shown in FIG. 6. This stage may transform each spectrum output 520 by the preprocessor into a vector of salient features 540 for a following classifier stage. The feature extractor 530 may reduce the quantity of data that must be passed to a classifier for each scene, and transform the scene spectrum to a representation where classification is simpler.

The spectrum 520 may first undergo a normalization process, where the spectrum is divided by a Planck's function, whose temperature is estimated from several points of the spectrum 520. The output may be a normalized spectrum, which has peaks and valleys around a nominal value of one.

The feature extractor may be sensitive to peaks and valleys in the spectrum. When the system is aimed at a blackbody scene, elements in the resulting feature vector may be zero except for noise. Warm target clouds relative to the scene may produce emission peaks in the spectrum and corresponding positive amplitude feature vector elements. Cool target clouds may produce absorption valleys and negative amplitude feature elements. Each feature in the feature vector may be extracted from the spectrum by comparison to a shape template that has been tailored to a particular peak in the absorption coefficient curve of a target or common interferent. Thus, each feature in the feature vector may characterize the peak or valley in the scene spectrum at a frequency band with a shape template that corresponds to a known target/interferent absorption feature.

The shape templates utilized by the feature extractor 530 may be selected using a heuristic approach with an objective of maximizing detection sensitivity and discriminating capability. The most prominent shape templates from each target may be chosen since these provide the greatest detection sensitivity relative to the noise in the system. Some prominent interferent shape templates may also be chosen because these can sometimes provide discriminating capability. Generally, a set of 20 to 40 shape templates may be selected and packaged into a feature matrix 510 that can be loaded into the system via an interface 515. Typically, a shape template may correspond to a single peak in the absorption coefficient curve of a target or interferent, although sets of nearby peaks are also sometimes used to form a single template. Further, the shape templates should properly reflect the peak-broadening and other distortion introduced by the measurement system.

The feature extractor 530 may produce a discriminating feature vector 540. For the subset of scenes that are relatively simple, i.e., a target or interferent cloud against a relatively benign background, a target decision may be made based on a threshold on the feature vector. For more complex scenes, i.e., multiple target s and/or interferents and feature-rich backgrounds, a further classifier stage described herein may be utilized.

FIGS. 7a, 7b, 7c and 7d illustrate several filters, or templates of characteristic spectral bands for known target s based on their absorption coefficient curves. Multiple filters for different, or the same target, may be shown in templates 610, 615, and 620. The first template 610 may have two peaks indicated at 625 and 630. Both the height and shape of the curves may be representative of the potential target. Template 615 may have a curve 635, and template 620 may have four curves 640, 641, 642, and 643, which are representative of target s by amplitude and shape. Curves 641 and 642 may contain a double peak, such as a small amplitude peak immediately followed by a larger amplitude peak.

Graph 645 illustrates matching of template 615 to detected spectra. Filters 640, 641, 642, and 643 are shown superimposed on the graph with spectral band from the normalized spectra 650. A comparison of the shape templates to the detected spectrum may be performed using a least squares fit algorithm, which has been analytically reduced to an equivalent set of matrix operations. The fit algorithm may compute amplitude, slope, offset, and mean square error of fit (mse) between the template and the spectral region. Given a shape template, S, whose first and second moment are zero (i.e., mean(S)=0 and S. L=0), and the corresponding spectral region, Y, (both Y and S are vectors of length n), the amplitude, slope, offset, and mse may be computed as in the following, amplitude=$Y*S'$,
slope=$Y'*L$,
offset=mean($Y$), and
mse=square root(($\Sigma(P(i)-Y(i))^2)/n$), where $L=(L_0-\text{mean}(L_0))/\text{norm}(L_0-\text{mean}(L_0))$ and $L_0$ is a vector equals to 1, 2, . . . , n, $P=\text{offset}*U+\text{slope}*L+\text{amplitude}*S/\Sigma S(i)^2$; and U is a vector whose n elements equal to 1.

One may note that P is the best fit to Y given the free parameters amplitude, slope and offset.

Figure 8:
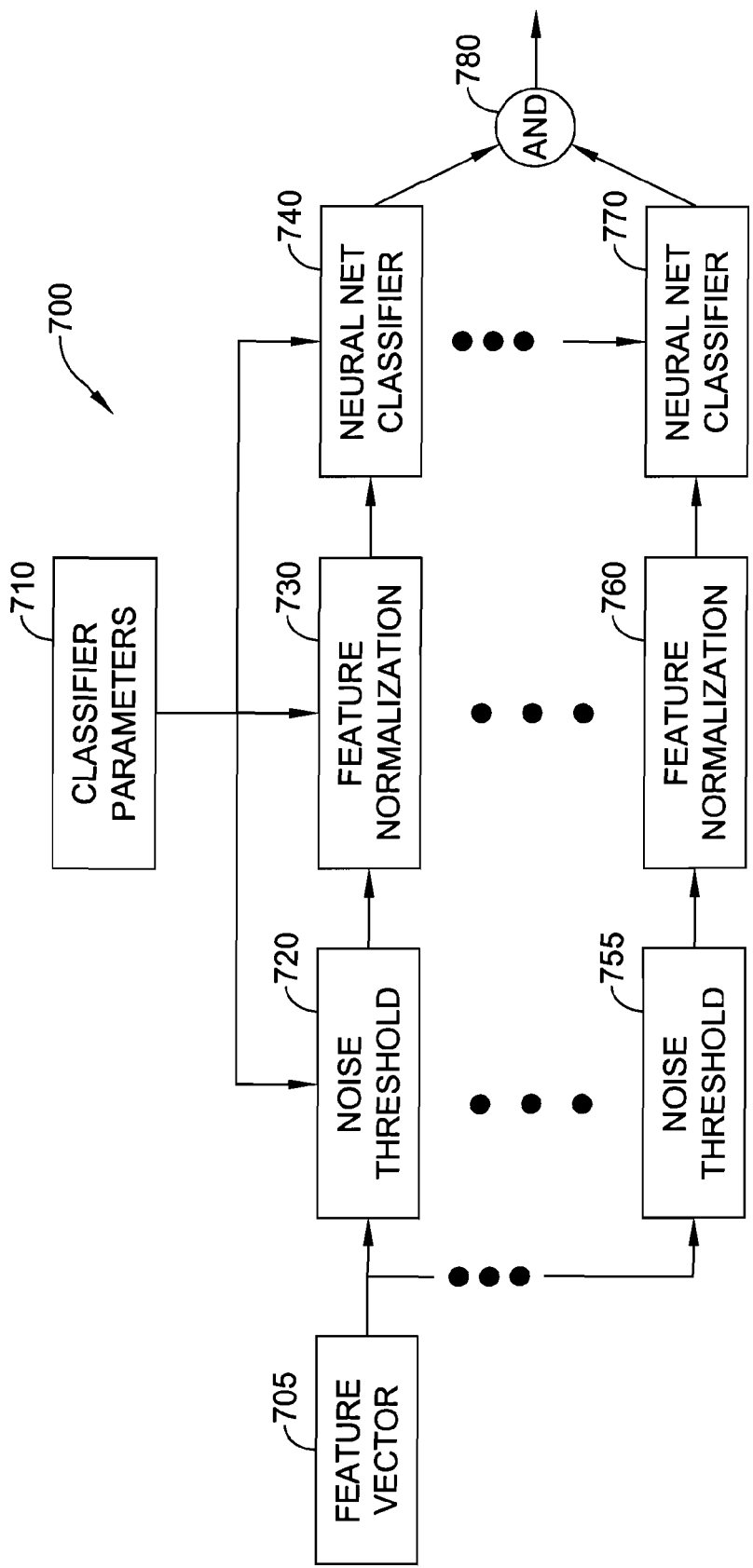
FIG. 8 is a block flow diagram of classifying feature vectors to identify target chemicals.

Another stage of the detection system may include the classification or classifier 700, as shown in FIG. 8. The main objective of this stage is to classify the extracted feature vector 540 into one or more classes. Each class may indicate the presence of the associated class target or the no-target class. A classifier's challenge may be to detect a target under emission as well as absorption conditions, and also in the presence of different interferents. In this case, the classifier should map different signatures or feature vectors in order to classify the interferogram properly. (Shall we include the rule-based classifier?)

The feature vector is represented at 705 in FIG. 8. A plurality of classifier predetermined parameters for target s may be illustrated at 710, and be used to effectively tailor the algorithm to detect the targets. The parameters may be provided to a number of algorithms having feature indices for each classifier, noise threshold 720, feature normalization 730 and neural net classifier 740. Each of these algorithms may be duplicated for each different chemical to be detected, as indicated with dots, and blocks 755, 760 and 770. The classifier parameters 710 may be used to program each of the sets of algorithms based on extensive training and heuristic data.

The first process of the classifier may include a preconditioning step, where the classifier performs a normalization step process 730 . . . 760 to be able to detect or classify a wider range of chemical signatures. Normalization step may be an option determined by a parameter in the classifier parameters 710. Also involved may be a noise threshold test 720 . . . 755, which measures and removes very weak signals. The measure may be a weighed sum of features that are predefined for each chemical classifier, and is compared with a threshold. This threshold may be adaptively set according to minimum detection requirements for each chemical, the false alarm requirements and the SNR for the system in operation. When the measure does not exceed the threshold, a weak signal and no-chemical detection for that chemical classifier may be declared without exercising that chemical neural network.

The heart of the classification approach may be a neural network bank 740 . . . 770, in which each of the neural networks is trained to detect a particular chemical and reject other non-similar chemical s, different interferents and background signatures. The neural network may be based on the back-propagation architecture with one hidden layer. The size of the hidden layer may be carefully chosen in order to classify the chemical under different scenarios and not overgeneralize the detection scheme. An output threshold 780 may be associated with each neural network that is tuned based on detection performance and false alarm rate. Since there are usually multiple templates per chemical deriving the key discriminating features for that chemical, not necessarily all of the features in the feature vector need be run through the neural network for it to arrive at the target detected decision. The selected feature indices for each classifier may be stored in the classifier parameters 710.

Although the classifier architecture may be the same for search and confirmation modes, the vector size, hidden layer size, and trained coefficients can be different as represented by classifier parameters 710. The training for each mode may be done based on different objectives, which are related on the chemical signature, the detection and false alarm requirements, and noise characteristics of each mode.

The simulation software, which is based on a multi-cloud radiometric model, may simulate interferograms for target chemicals, simulants, interferents, and other chemical compounds. The simulated data may be used for training and testing. A large amount of training data may be utilized. Random subsets of the training data may be used to iteratively train the neural networks 740 . . . 770. Sequential training sets may also be populated with problematic training information from the set used in the previous iteration.

A background estimation (BE) approach may purify spectral data by removing background features and system artifacts. The approach may have preprocessing, feature extraction and classification. The approach may also have on-the-move detection capability, current field of regard (FOR), and real-time results and reporting.

The technical capabilities of BE may be noted. The removal of system artifacts and background features may be accomplished by using information from nearby spectra in the FOR. The nearby spectra may include the n=3 most recent background field of view (FOV) spectra as a scanner scans across the FOR. The recent spectra may be saved in a rolling buffer and used as a background for use at each new target FOV spectrum.

For each field of view, a simplified model of the sensed radiance ($\text{Spec}_{sensed}$) may have three components which include the background radiance ($\text{Spec}_{back}$), the chemical cloud ($\text{Spec}_{cloud}$) if any, and the system self radiance ($\text{Spec}_{sys}$), which is often referred as the system artifacts, that is, if a chemical cloud is present, the $$\text{Spec}_{sensed}(\text{fov}_i)=\text{Spec}_{back}(\text{fov}_i)+\text{Spec}_{cloud}(\text{fov}_i)+\text{Spec}_{sys};$$

if a chemical cloud is not present, then $$\text{Spec}_{sensed}(\text{fov}_i)=\text{Spec}_{back}(\text{fov}_i)+\text{Spec}_{sys}.$$

One background removal technique may subtract the input spectrum, $\text{Spec}_{sensed}(\text{fov}_{in})$ from the spectrum of an adjacent FOV, $\text{Spec}_{sensed}(\text{fov}_1)$. Assuming the case that the input spectrum has a chemical cloud and the adjacent FOV does not have a chemical cloud, then the difference spectrum may consist of the chemical cloud radiance and the radiance residue between the two FOV's. That is, $$\text{Spec}_{diff}(\text{fov}_{in})=\text{Spec}_{sensed}(\text{fov}_{in})-\text{Spec}_{sensed}(\text{fov}_1)$$
$$=\text{Spec}_{cloud}(\text{fov}_{in})+\text{Spec}_{back}(\text{fov}_{in})-\text{Spec}_{back}(\text{fov}_1).$$

The system artifacts, which remain constant between the two FOV's, may be removed. If the backgrounds of the two FOV's are similar, the radiance residue may also be close to zero. In such case, the most prominent signature may be that of the chemical cloud. In the case when the two FOV backgrounds are different, this technique will not necessarily work well since the background residue may mask the signature of the target chemical.

This disclosure does not simply use the spectrum from nearby FOVs, $\text{Spec}_{back}(\text{fov}_1)$, to be the estimated background spectra, as many conventional approaches do. Rather the estimated background spectra are intelligently derived from the nearby spectra such that the estimated background spectrum optimally match with the input spectrum as follow:

$$\text{Spec}_{estBack}(\text{fov}_{in})=C_1*\text{Spec}_{back}(\text{fov}_i)+C_2+C_3*X \qquad \text{Eq. 1}$$

where $\text{Spec}_{back}(\text{fov}_i)$ is the spectrum of the $i^{th}$ nearby FOV, X is a linear line, effectively adjusting the slope of the background.

$C_1$, $C_2$ and $C_3$ are constants that are automatically computed to maximally match the background spectral region.

Figure 9:
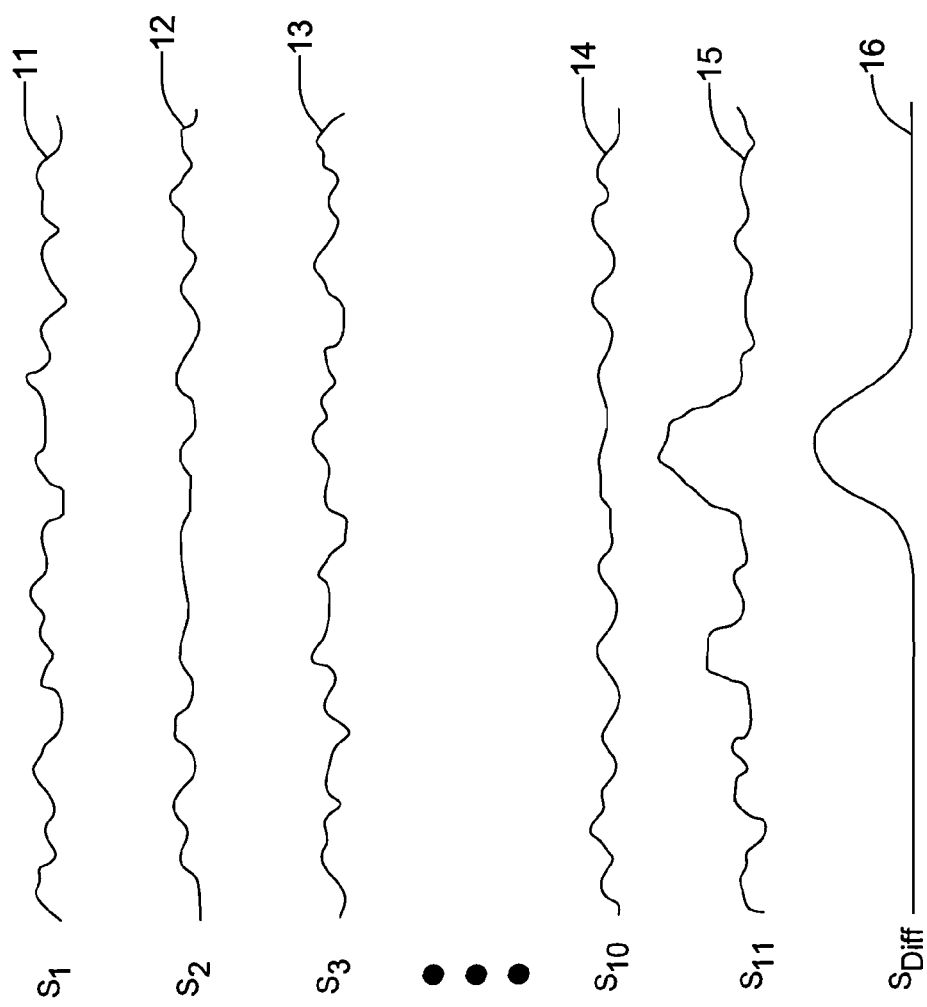
FIG. 9 is a diagram of a sequence of example spectra which may constitute background for removal from a current spectrum to obtain a difference spectrum.

FIG. 9 is a diagram of a sequence of example background waveforms $S_1$, $S_2$, $S_3$, . . . , and $S_{10}$. $S_1$ through $S_{10}$ appear to look about the same and are previous to a current waveform $S_{11}$ which appears to be different than the previous waveforms. Each of $S_1$ through $S_{11}$ may be referred to as a spectrum (spec). The background from $S_{11}$ may be somewhat removed by obtaining a difference spectrum ($\text{Spec}_{Diff}$).

$\text{Spec}_{Diff}=(S_{11}-\text{Spec}_{estBack}(\text{fov}_{11}))$, where the estimated background, $\text{Spec}_{estBack}(\text{fov}_{11})$, is computed using $S_{10}$ in Eq. 1. To attempt to get a resultant waveform, such as $\text{Spec}_{Diff}$, with more precision, one may first compute more or less three intermediate spectra, $\text{Spec}_{estBack8}$, $\text{Spec}_{estBack9}$, $\text{Spec}_{estBack10}$ from previous spectra, $S_8$, $S_9$, and $S_{10}$ using Eq. 1. The estimated background, $\text{Spec}_{estBack}(\text{fov}_{11})$, is then computed as a weighted sum according to the expression, $$\sum_{i}^{n} w_i * spec_{estBackfov(i)}$$

where the total sum of the weights is equal to one. For example, a set of weighted backgrounds to attempt may include $\text{Spec}_{estBack}(\text{fov}_{11}) = 1.0 * \text{Spec}_{estBack10} + 0.0 * \text{Spec}_{estBack9} + 0.0 * \text{Spec}_{estBack8}$, $\text{Spec}_{estBack}(\text{fov}_{11}) = 0 * \text{Spec}_{estBack10} + 0.0 * \text{Spec}_{estBback9} + 1.0 * \text{Spec}_{estBback8}$, $\text{Spec}_{estBack}(\text{fov}_{11}) = 0.34 * \text{Spec}_{estBback10} + 0.33 * \text{Spec}_{estBback9} + 0.33 * \text{Spec}_{back8}$.

The individual weights may be decided with various approaches, even an arbitrary one. Here the weights may be decided on the basis of maximum immunity to background changes, maximum immunity to diffuse cloud edges, and maximum noise reduction.

Figure 10:
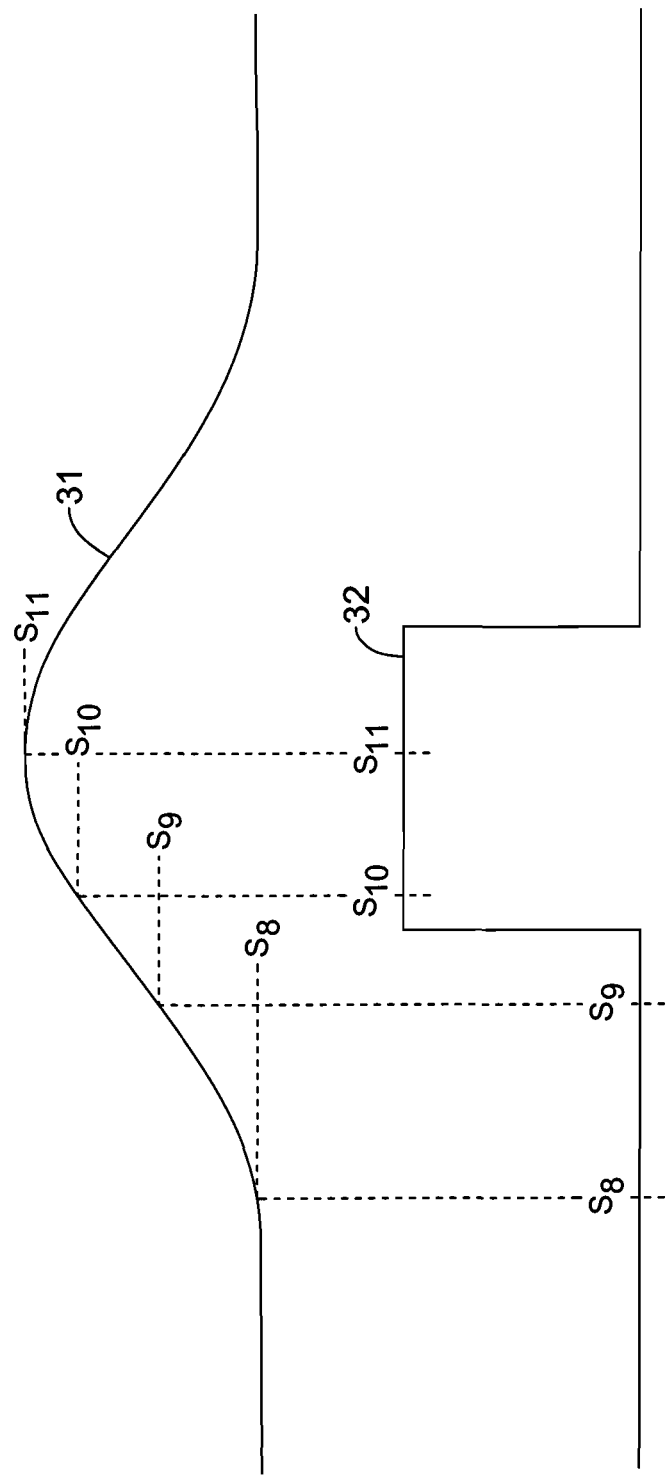
FIG. 10 is a diagram showing variations of spectra having background and chemical cloud and variation of the two combined.

Different indications of a cloud may result in a different weighting of the individual backgrounds $S_8$, $S_9$ and $S_{10}$. In FIG. 10, curve 31 shows $S_8$ to be pure background and $S_{11}$ to be pure cloud. $S_8$ may have some cloud and $S_9$ may have more cloud. $S_8$ may be best for a slow cloud turn-on.

A diagram 32 in FIG. 10 appears like a square wave or step function. $S_8$ and $S_9$ appear as pure background and $S_{10}$ and $S_{11}$ appear as pure cloud. A difference between the sharp edge and curve cloud is that subtracting $S_{10}$ would not result in a strong peak. However, subtracting $S_8$ or $S_9$ would result in a strong peak. In using the background formula, the number of backgrounds and their weights may be determined with engineering judgment and calculations. The total constant weight, of course, would equal one. The determination of backgrounds and their respective weights may be made with trying various numbers of spectrums as background and using different weights for the various spectrums. Such process may be limited by processor speed.

Since the BE approach may remove the sensor artifacts and remove background clutter peaks across the spectrum, the result is an improvement in small signal detection. The sensor-to-sensor performance variations caused by sensor artifacts may be reduced. Another advantage of the BE methodology may include more symmetric emission versus absorption performance by classifying an inverted difference spectrum and by removing artifacts and background/atmosphere clutter.

The background estimation may be considered as part of preprocessing in the system. Thus, it may be applied to inputs of the system detection process regardless which chemical compound is intended to be detected. In summary, advantages of the BE approach may include an elimination of sensor artifacts, reduction in background clutter, and production of more consistent performance results across virtually all sensors.

The present system may be situated on a moving vehicle. The estimated background may constantly be changing because of the system's movement with the vehicle.

Figure 11:
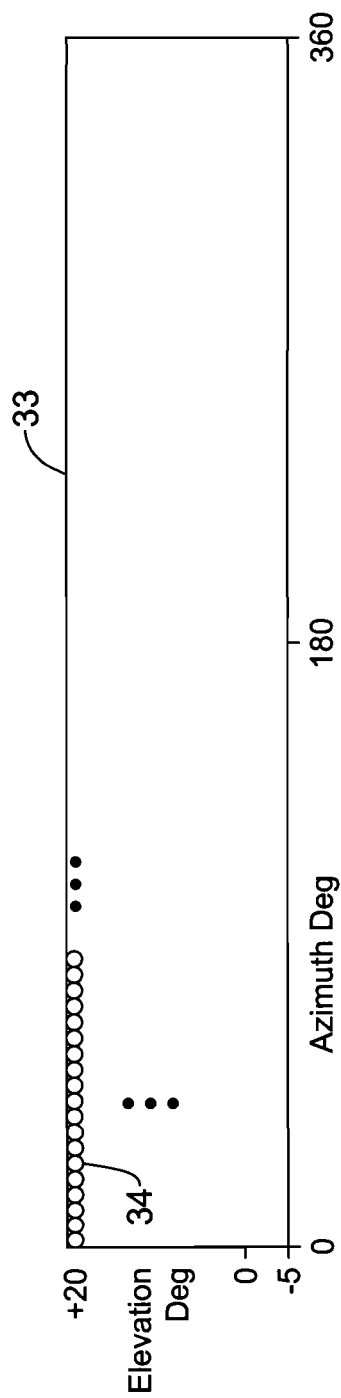
FIG. 11 is a diagram of a field of regard containing with a series of FOV's.

Whether the system is on a moving vehicle or not, it may have a way of looking around for various clouds of, for example, a chemical target. One way may include scanning about an azimuth and elevation as shown with fields of views (FOV's) converging a field of regard (FOR). FIG. 11 shows a field of regard 33 with a series of FOV's 34 shown as circles. FOV's may cover the whole FOR. One design of the scanning may be the FOV's as 1.5 degree diameter sized adjacent circles where the scan is like from one circle to another in an azimuth of 360 degrees to a plus twenty degrees. The system may scan from the lower portion of FOR 33 and move one row on up upon each rotation of the scan through 360 degrees of azimuth. Upon completion of a scan of FOR 33, the scan may be redone. There may other patterns of scanning. A scanning apparatus may have selectors for various scanning patterns.

Figure 12:
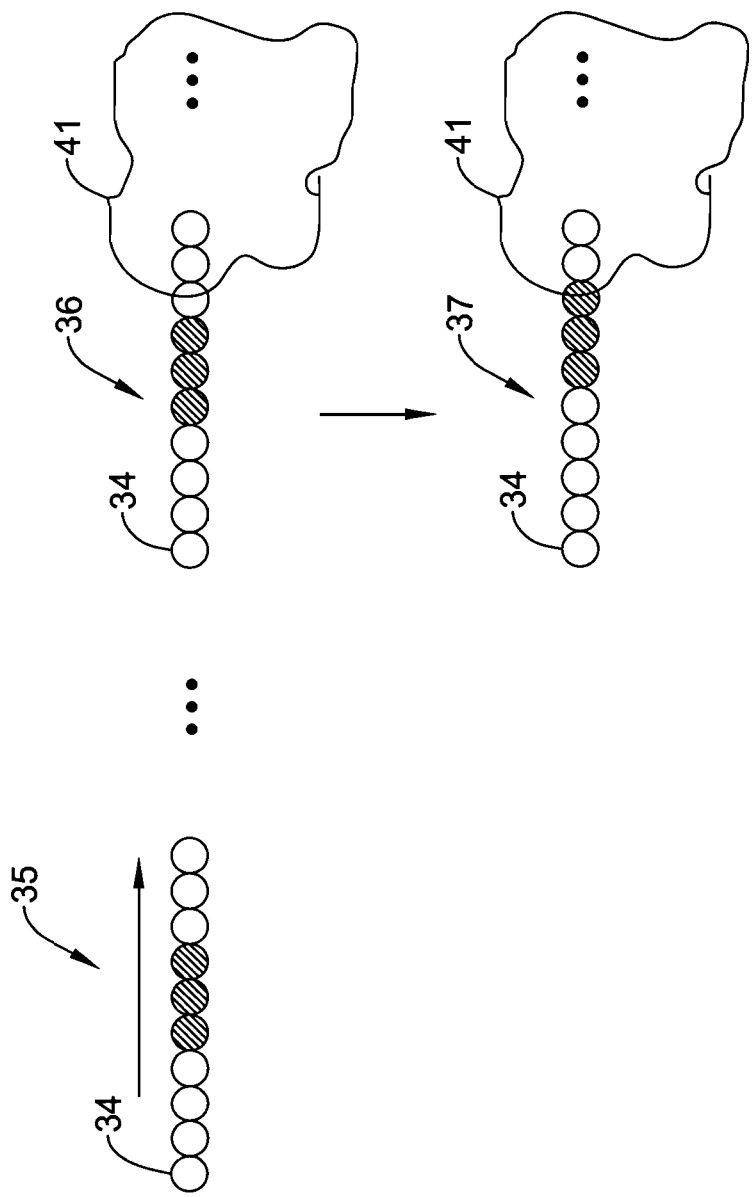
FIG. 12 is a diagram showing instances of increments of scanning a number of FOV's where a cloud may exist or not.

Instances of increments of scanning are shown in FIG. 12. A number of FOV's 34 may be scanned. The shaded FOV's of group 35 may indicate background spectrums $S_8$, $S_9$ and $S_{10}$. The next FOV may represent spectrum $S_{11}$. These FOV's may continue on to a group 36 where the shaded FOV's indicate background spectrums $S_{27}$, $S_{28}$ and $S_{29}$. The next FOV may represent spectrum $S_{30}$. In group 36, spectrum 30 is shown to be partially entering a cloud 41. However, spectrum 36 may not reveal the target chemical of the cloud. In group 37, spectrum 30 is shown further in cloud 41 and thus improving appearance of the target chemical of the cloud in spectrum 30. Spectrums 28-29 may be regarded as background and used in calculating the $\text{Spec}_{DiFF}$.

Figure 13A:
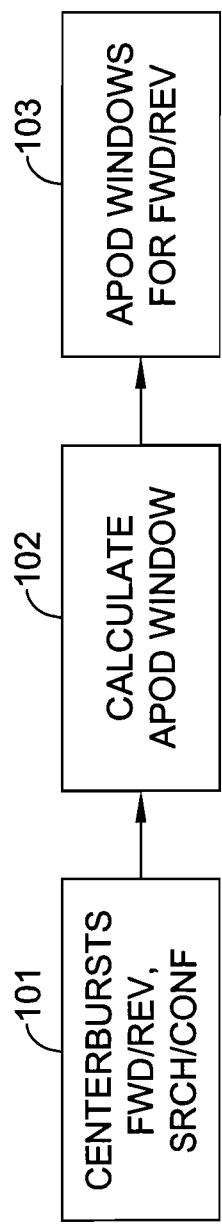
FIGS. 13a and 13b are flow diagrams of calculating apodization windows and chirp fast Fourier transform parameters.
Figure 13B:
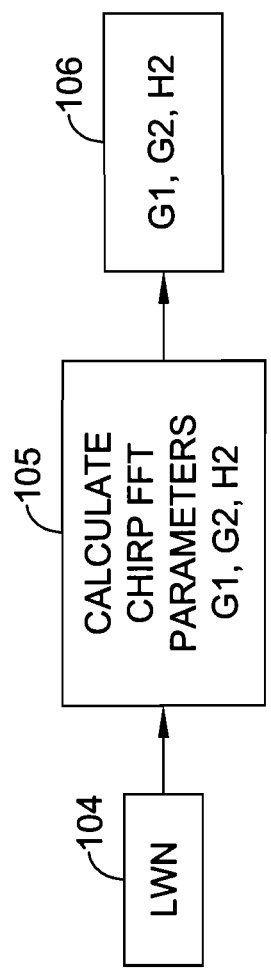

FIGS. 13a, 13b, 14, 15 and 16 are flow diagrams revealing various aspects of the system including processes and calculation. At the start of a search mode (or confirm which is similar), certain calculations may be made as shown in FIGS. 13a and 13b. Data that persisted from the RPA mode may be used in the calculations. There may be a module 101 for centerbursts forward/reverse and search/confirm. From module 101 an apodization window may be calculated at module 102 with an output 103 of apodization windows for forward/reverse. An LWN 104 may be input to a module 105 for calculating chirp fast Fourier transform (FFT) parameters as an output 106 of g1, g2, h2. Unlike FIG. 13b, the current DSP code may store g1, g2, h2 from the RPA mode for later use in operation search (OperSrch) and operation confirm (OperCfm).

Figure 14:
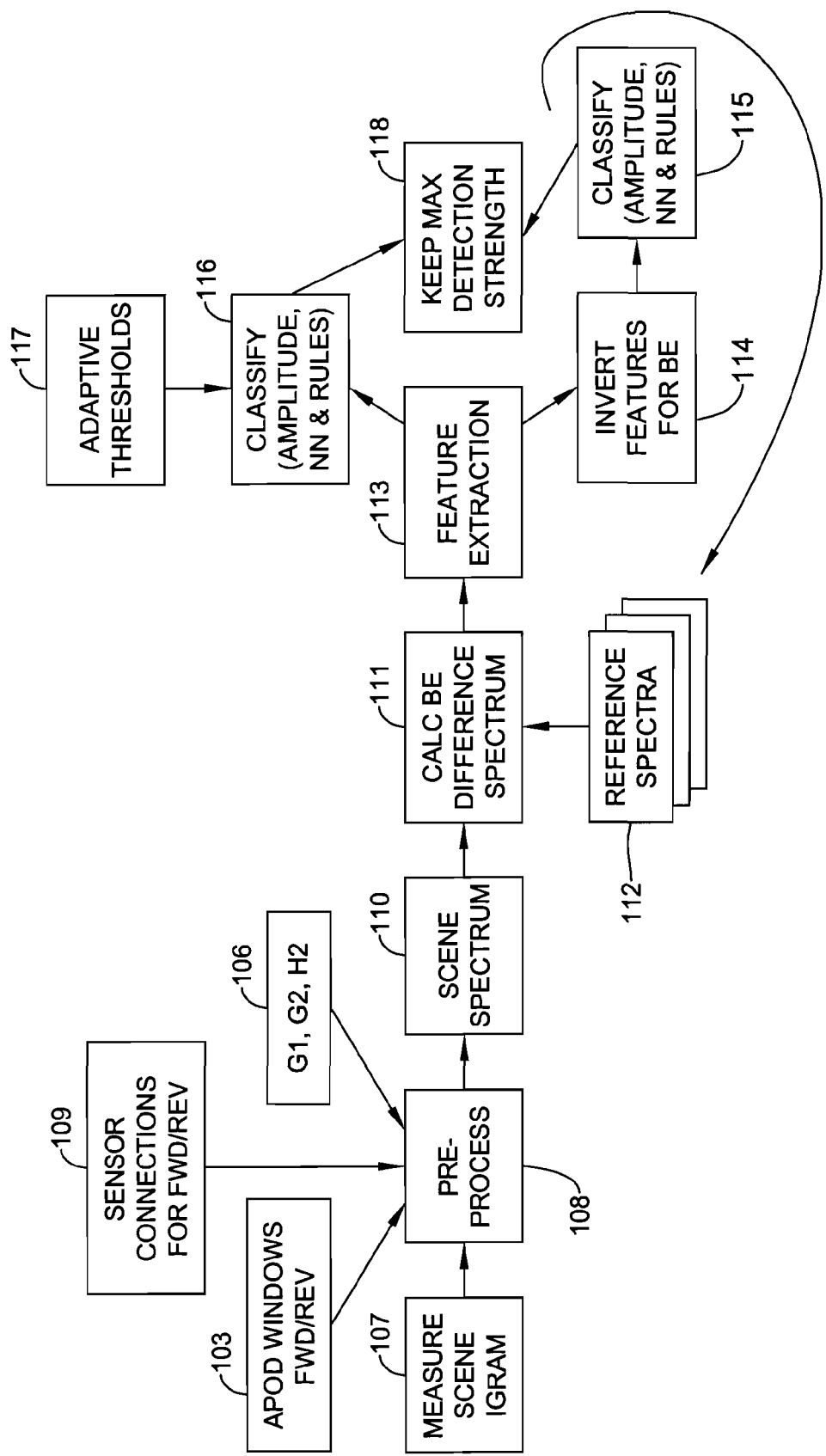
FIG. 14 is a flow diagram of an approach where the background estimation calculation may be done continuously during a spectra search mode.

FIG. 14 is a flow diagram of an approach where the background estimation calculation may be done continuously during a spectra search mode. A scene interferogram (igram) may be measured at module 107 with an output to a pre-process module 108. Other inputs to the pre-process module 108 may include apodization windows forward/reverse from module 103, parameters g1, g2, h2 from module 106 and sensor connections for forward/reverse from module 109. Pre-process module 108 may output a scene spectrum 110 which may go to a module 111 for calculating a background estimation (BE) difference spectrum. Also input to module 111 may be reference spectra 112. The difference spectrum may go to a module 113 for feature extraction. The features from module 113 may invert the features for the background estimation in module 114. These inverted features may be classified at module 115 according to amplitude, with neural network (NN) and rules. The features from module 113 may also go to module 116 to be classified according to amplitude, neural network and rules, in conjunction with network thresholds from a module 117. The classification results from modules 115 and 118 may go to a module 119 for keeping maximum detection strength for the system. The flow of the process from module 111 though modules 115 and 116 may be repeated for each background estimate reference spectrum from reference spectra 112.

Figure 15:
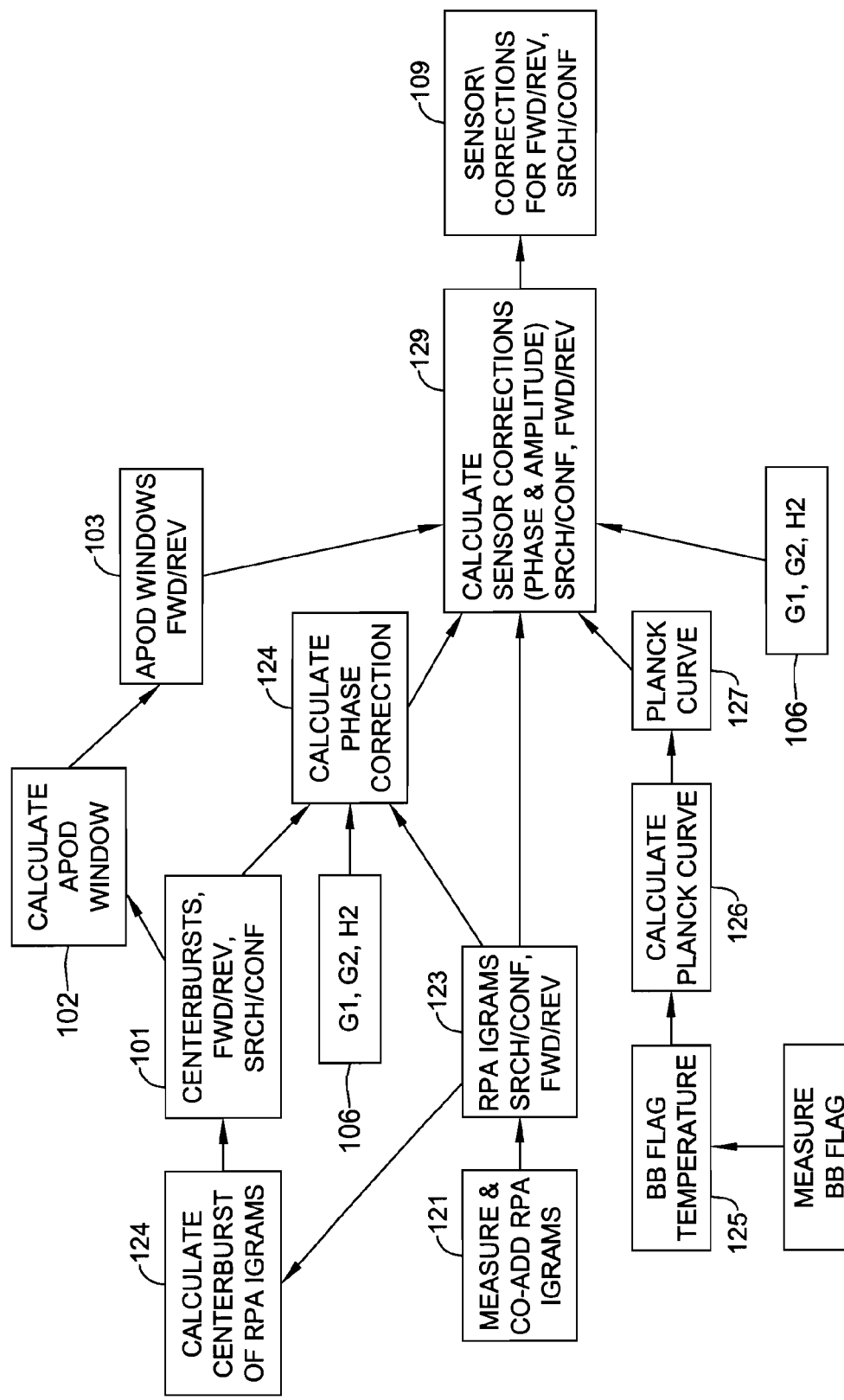
FIG. 15 is a flow diagram of an approach for providing sensor corrections during an RPA collection mode.

FIG. 15 shows a flow diagram of an approach for sensor corrections which may be done during an RPA collection mode. At module 121, RPA igrams may be measured and co-added. The BB flag temperature may be measured at module 122. The RPA igrams and temperature should be measured at the same time. The output of module 121 may go to a module or stage 123 for RPA igrams search/confirm and forward/reverse. These RPA igrams may go to module 124 for a calculation of the centerburst of the RPA igrams, which result in the centerbursts forward/reverse and search/confirm at module 101. Centerburst information may go from module 102 where an apodization window is calculated resulting in apodization windows of forward/reverse at module 103. The apodization window information may go to a module 129 for calculating sensor corrections in terms of phase and amplitude for search/confirm and forward/reverse. The centerburst information at module 101 may also go to a module 124 for calculating a phase correction. RPA igram information for search/confirm and forward/reverse at module 123 may go to module 124. Parameters g1, g2, h2 may be provided from module 106 to module 124. With the information from modules 101, 123 and 106, the phase correction may be calculated and provided to module 129. The measured flag temperatures at module 125 from module 122 may be provided to module 126 for calculation of a Planck curve as an output at module 127 which may go to module 129. Also, parameters g1, g2, h2 may be provided to module 129. Module 129 may calculate the sensor correction with inputs from modules 103, 124, 127 and 106. The sensor connections from module 129 may be output to module 109 as sensor corrections for forward/reverse and search/confirm. It may be noted that only the data in modules 101, 104, 109, and 117 should persist in OperSrch and OperConf.

Figure 16:
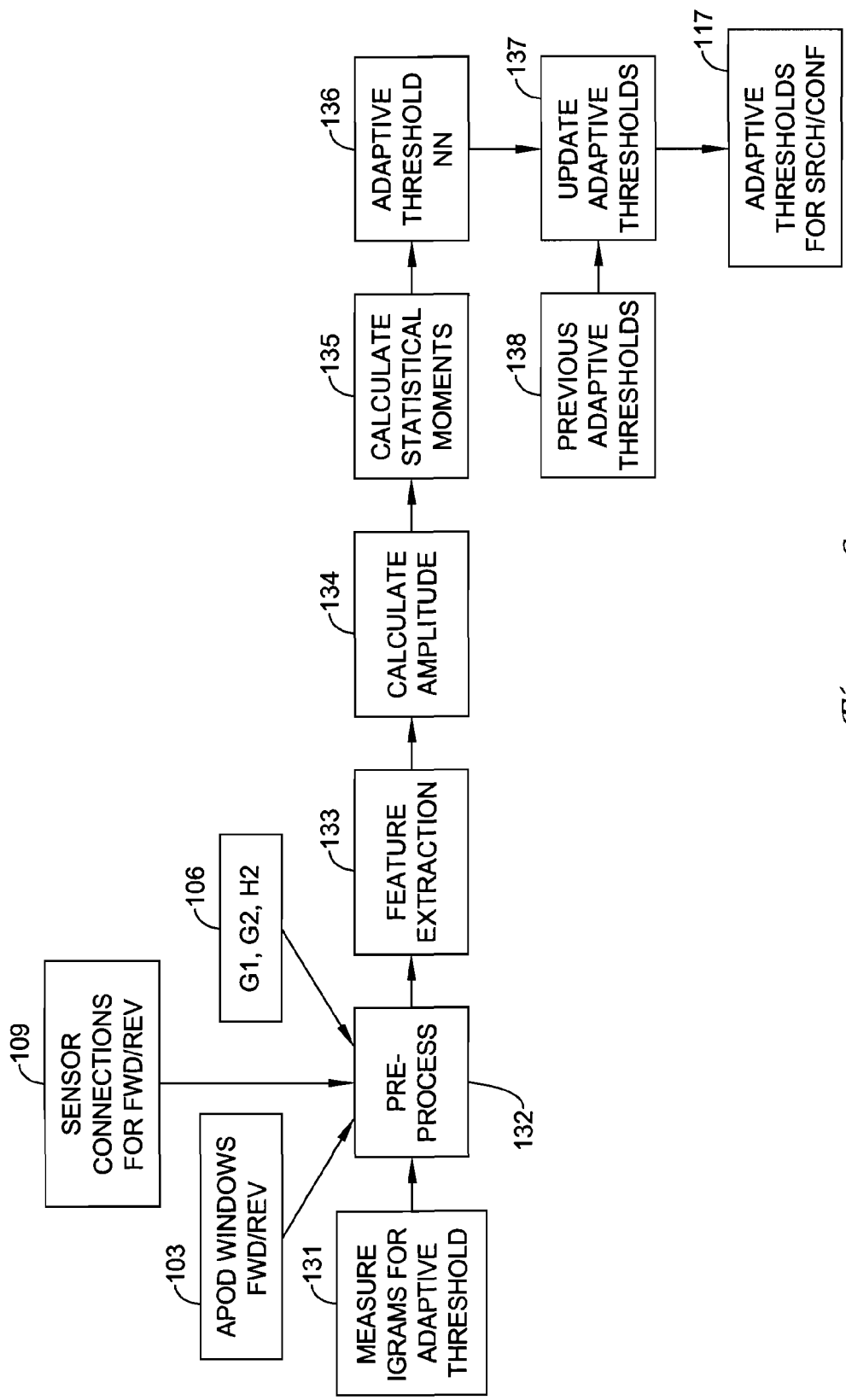
FIG. 16 is a flow diagram of an approach for updating adaptive thresholds during the RPA collection mode.

FIG. 16 is a flow diagram of an approach for updating adaptive thresholds which may be done during an RPA collection mode. Measurement of igrams for adaptive thresholds may be provided from module 131 to a pre-process module 132. Module 132 may also receive inputs of apodization windows for forward/reverse from module 103, parameters g1, g2, h2 from module 106, and sensor corrections for forward/reverse from module 109. Feature extraction at module 133 may be applied to an output of pre-processing module 132. Amplitude of extracted features from module 133 may be calculated at module 134. Statistical moments may be calculated at module 135 from the outputs from module 134. Outputs from module 135 may go to module 136 having an adaptive threshold neural network module 136. Adaptive threshold information provided by module 136 may go to module 137 for updating adaptive thresholds. Previous adaptive thresholds from module 138 may be provided to module 137 for updating based on information from module 136. Module 117 may include adaptive thresholds for search/confirm as provided by module 137.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:
1. A spectral detection system comprising:
a scanner;
a spectrometer connected to the scanner; and
a processor connected to the spectrometer; and
wherein:
the scanner is for capturing fields of view (FOV's) of spectra;
the spectrometer is for detecting and converting the FOV's of spectra into electrical signals; and
the processor is for:
processing the FOV's of spectra from the electrical signals;
processing each FOV for a spectrum of interest;
selecting an FOV having the spectrum of interest;
recalling several FOV's previous to the FOV having the spectrum of interest; and/or
calculating an estimated background spectrum from the background spectra of the several FOV's according to their weights of significance; and
wherein:
an estimated background spectrum is about equal to

$$\sum_{i=1}^{n} W_i * Spec_i;$$

$W_i$ is a weight of an $i^{th}$ FOV background spectrum;
$Spec_i$ is the $i^{th}$ FOV background spectrum; and
n is a number of the several FOV's not regarded as having the spectrum of interest.

2. The system of claim 1, wherein the estimated background spectrum is an average of the spectra from the several FOV's.

3. The system of claim 1, wherein the processor is further for determining a difference spectrum from each of the estimated background spectra of the several FOV's and the FOV having the spectrum of interest.

4. The system of claim 1, wherein the weight of each $i^{th}$ FOV is determined on-the-fly in view of a changing background.

5. A spectral detection system comprising:
a scanner;
a spectrometer connected to the scanner; and
a processor connected to the spectrometer; and
wherein:
the scanner is for capturing fields of view (FOV's) of spectra;
the spectrometer is for detecting and converting the FOV's of spectra into electrical signals; and
the processor is for:
processing the FOV's of spectra from the electrical signals;
processing each FOV for a spectrum of interest;
selecting an FOV having the spectrum of interest;
recalling several FOV's previous to the FOV having the spectrum of interest; and
calculating an estimated background spectrum from the background spectra of the several FOV's according to their weights of significance; and
wherein:
an estimated background spectrum is about equal to $$\sum_{i=1}^{n} W_i * Spec_i;$$

$W_i$ is a weight of an $i^{th}$ FOV background spectrum;
$Spec_i$ is the $i^{th}$ FOV background spectrum; and
n is a number of the several FOV's not regarded as having the spectrum of interest.

6. The system of claim 5, wherein the estimated background spectrum is an average of the spectra from the several FOV's.

7. The system of claim 5, wherein the processor is further for determining a difference spectrum from each of the estimated background spectra of the several FOV's and the FOV having the spectrum of interest.

8. The system of claim 5, wherein the weight of each $i^{th}$ FOV is determined on-the-fly in view of a changing background.

* * * * *